US007005457B2

(12) United States Patent
Loh et al.

(10) Patent No.: US 7,005,457 B2
(45) Date of Patent: Feb. 28, 2006

(54) MULTI-FUNCTIONAL MICROENCAPSULATED ADDITIVES FOR POLYMERIC COMPOSITIONS

(75) Inventors: Roland R. Loh, Tallmadge, OH (US); Barbara A. Fabian, Medina, OH (US); Zhang Wentao, Nanjing (CN); Gu Nong, Nanjing (CN)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 6 days.

(21) Appl. No.: 10/600,942

(22) Filed: Jun. 20, 2003

(65) Prior Publication Data

US 2004/0051191 A1 Mar. 18, 2004

Related U.S. Application Data

(60) Provisional application No. 60/390,130, filed on Jun. 20, 2002.

(51) Int. Cl.
*C08J 9/00* (2006.01)

(52) U.S. Cl. ........................ 521/76; 521/146; 521/906; 521/907; 523/201; 523/205; 523/208; 523/210

(58) Field of Classification Search ................ 523/201, 523/205, 208, 210; 521/76, 146, 906, 907
See application file for complete search history.

(56) References Cited

U.S. PATENT DOCUMENTS

| | | | | |
|---|---|---|---|---|
| 3,968,060 A | | 7/1976 | Vincent et al. | |
| 4,138,356 A | * | 2/1979 | Vincent et al. | ........ 252/182.27 |

FOREIGN PATENT DOCUMENTS

| | | | |
|---|---|---|---|
| DE | 3438096 | | 4/1986 |
| EP | 178554 | * | 4/1986 |
| EP | 1 160 278 | | 5/2001 |
| JP | 2000-297169 | * | 10/2000 |
| WO | WO 02/28986 | | 4/2002 |

* cited by examiner

*Primary Examiner*—Ana Woodward
(74) *Attorney, Agent, or Firm*—Inger H. Eckert; Maria C. Gasaway

(57) ABSTRACT

Multi-functional microcapsules comprising a core material including a major portion of one or more functional additives and a shell material including at least one functional additive, a method of manufacturing such multifunctional microcapsules and polymeric products incorporating such multifunctional microcapsules are provided.

7 Claims, 6 Drawing Sheets

MULTI-FUNCTIONAL MICROENCAPSULATED ADDITIVES FOR POLYMERIC COMPOSITIONS

BACKGROUND OF THE INVENTION

Additives play a crucial role in the performance of polymeric materials, particularly polymeric foams, and are even more important in determining their properties. However, certain desirable additives may cause difficulties in the processing, the use and/or the disposal of polymeric materials as a result of the reactivity and cross-reactivity of the additives.

For instance, infrared attenuation agents are very effective in increasing the extinction coefficient, thus increasing the R-value of polymeric foams. However, many infrared attenuation agents are both inorganic and hydrophilic, which makes it difficult to disperse them in polymeric compositions. Other infrared attenuation agents may be very reactive with other additives often used in plastics, such as iron oxide and hexabromocyclododecane (HBCD), a flame retardant. Another important property for polymeric compositions is ultraviolet light stability. However, HBCD, for instance, increases the sensitivity of polystyrene foams to ultraviolet light.

Brominated flame retardants, such as HBCD, have been used extensively in extruded polystyrene (XPS) foams. However, brominated flame retardants are thought to cause bioaccumulation and ecotoxicity problems. Some Europeans countries, such as Sweden, totally ban the use of HBCD due to the potential for bioaccumulation and toxicity to aquatic organisms.

Additives may also impact the processing of polymeric materials. For instance, HBCD acts as a plasticizer, which tremendously decreases the strength of XPS foam products that incorporate it. In order to compensate for the weakening effects of HBCD or other additives that exhibit a plasticizer activity, additional material will be required in the form of thicker cell walls and struts to maintain the target strength of such foams, increasing both the density and the cost of the resulting products. Further, HBCD can decompose at higher processing temperatures, adversely affecting not only the product but also processing machinery, such as extrusion dies, barrels and screws.

Microencapsulation is a well developed technology that has been employed in many different fields. U.S. Pat. No. 3,660,321, for example, discloses shaped solid polystyrene articles comprising microcapsules containing flame retardant and having diameters of 20 microns (Example 1).

U.S. Pat. No. 4,138,356 teaches that microcapsules having an average diameter below 5 microns and containing flame retardant can be incorporated into polymeric materials such as polyurethane foam without affecting the structural integrity of the cell walls of the foam.

Example A of U.S. Pat. No. 5,043,218 discloses coating HBCD with a melamine:formaldehyde polymer to form microencapsulated HBCD having a mean particle size of 7.5 microns. This patent also teaches that polystyrene foams containing such microcapsules can be made using hydrocarbon blowing agents. European Patent No. 180795 discloses flame retardant agents comprising ammonium polyphosphate microencapsulated within a melamine formaldehyde resin.

SUMMARY OF THE INVENTION

The present invention provides a multifunctional microcapsules, a method of forming such microcapsules and polymeric materials incorporating one or more multifunctional microcapsules. The exemplary microcapsules include a core material that includes at least one functional additive encapsulated with a shell material that also includes at least one functional additive. Exemplary polymeric products incorporating one or more types of multifunctional microcapsules may be formulated to provide improved fire resistance, smoke suppression, infrared attenuation, strength, thermal stability, termite resistance and R-value (decreased thermal conductivity).

In a preferred embodiment, the core material includes a major portion of flame retardant encapsulated within a shell material including a major portion of a polymeric material, typically including one or more materials selected from a group consisting of polyolefins, polyurethanes, polyesters, polyethylene terephthalates and polycarbonates, and a minor portion of a functional additive. The functional additive(s) incorporated into the shell composition may be selected to improve or enhance the fire retardant, smoke suppression, thermal insulation, strength, thermal stability and or termite resistance of the final product.

In another preferred embodiment, the invention provides a polystyrene foam including from about 0.25 to about 10 weight percent, preferably from about 0.5 to about 3 weight percent, of a flame retardant additive microencapsulated within a functionalized polymeric shell composition, wherein the majority of the microcapsules have a diameter no greater than about 5 microns.

BRIEF DESCRIPTION OF THE DRAWINGS

(FIG. 3A) and HBCD microencapsulated in accordance with the present invention (FIG. 3B).

DESCRIPTION OF EXEMPLARY EMBODIMENTS

Figure 1:
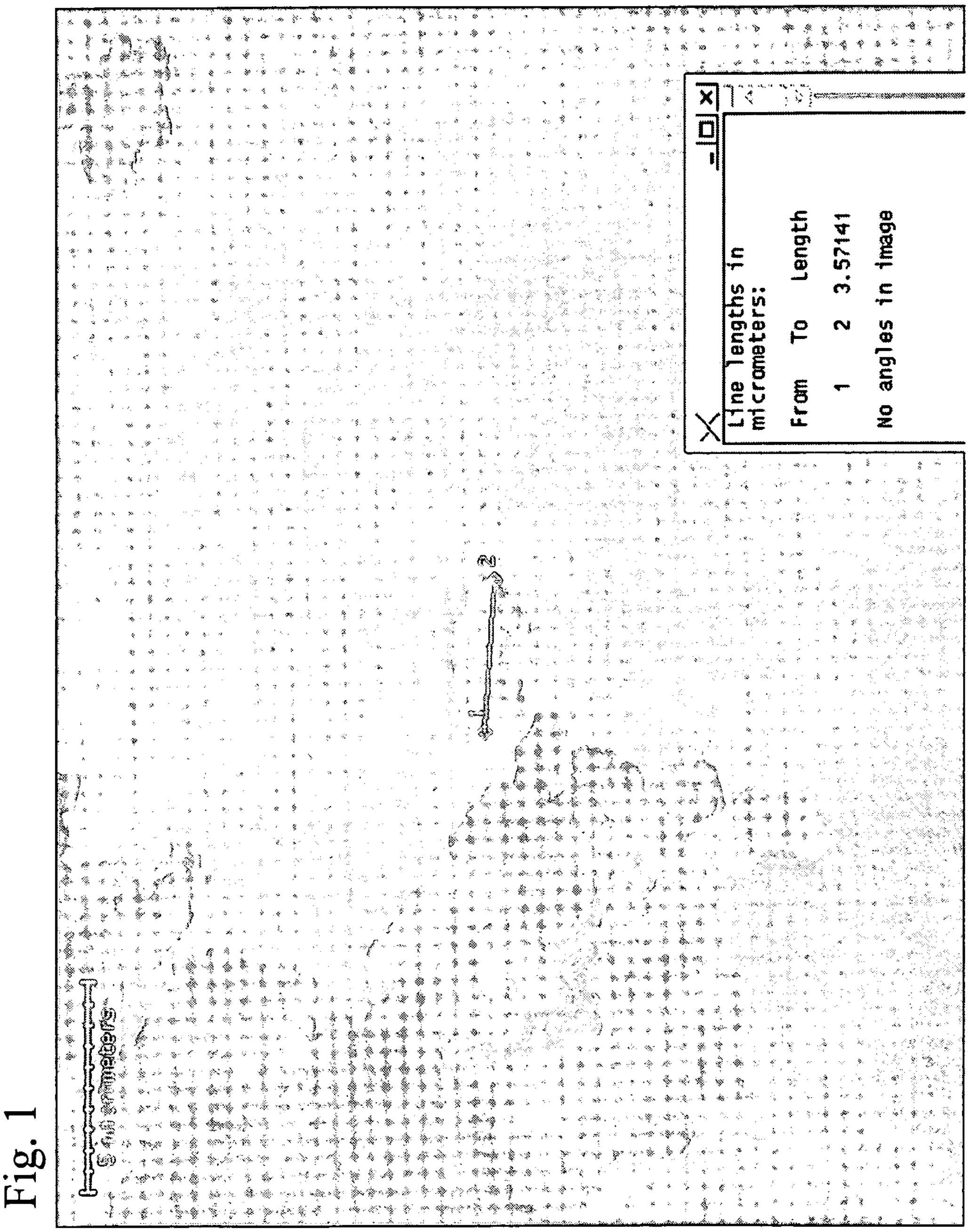
FIG. 1 shows the morphology of microencapsulated HBCD particles of this invention, at a scale of 10 $\mu$m.

Exemplary embodiments of the present invention provide microcapsules having a core composition including a major portion of one or more functional additives. Flame retardants, such as halogenated flame retardants, are preferred as the major component of the core composition.

Conventional halogenated flame retardants may be used in the core composition including, for example, bromides of aliphatic or alicyclic hydrocarbons such as HBCD; bromides of aromatic compounds such as hexabromobenzene, ethylene bis(pentabromodiphenyl), BE-51 (a tetrabromobisphenol A bis (allyl ether) commercially available from Great Lakes Chemical Company, West Lafayette, Ind.), decabromodiphenylethane, decabromodiphenyl ether, octabromodiphenyl ether, 2,3-dibromopropyl pentabromophenyl ether; brominated bisphenols and their derivatives such as tetrabromobisphenol A, tetrabromobisphenol A bis(2,3-dibromopropyl ether), tetrabromobisphenol A (2-bromoethyl ether), tetrabromobisphenol A diglycidyl ether, adducts of tetrabromobisphenol A diglycidyl ether and tribromophenol; oligomers of brominated bisphenol derivatives such as tetrabromobisphenol A polycarbonate oligomer, epoxy oligomers of an adduct of tetrabromobisphenol A glycidyl ether and bromobisphenol; bromoaromatic compounds such as ethylene bistetrabromophthalimide, and bis(2,4,6-tribromophenoxy)ethane; brominated acrylic resins; and ethylene bisdibromonorbornane dicarboxyimide.

Chlorinated flame retardants such as chlorinated paraffin, chloronaphthalene, perchloropentadecane, chloroaromatic compounds and chloroalicyclic compounds may also be used. Similarly, phosphorus based flame retardants, such as TPP (triphenyl phosphate) and other flame retardants such as DCP (dicumyl peroxide) can be incorporated into the core composition and may be used alone or as a mixture.

In addition to flame retardants, other functional additives may be included in the core material composition including, for example, smoke suppressants, such as antimony oxide, and infrared attenuation agents, such as black iron oxide, manganese (IV) oxide and nano-particle carbon black.

The core material will, in turn, be encapsulated within a polymeric shell material to form the microcapsules. The shell materials used in the present invention are preferably selected to be thermally, chemically, and mechanically stable in polymeric compositions into which they will be incorporated and the anticipated applications for those polymeric compositions.

However, in accordance with the present invention, functional additives are blended into the shell material to improve such properties of products incorporating the microcapsules such as flame resistance agents, smoke suppressants, infrared attenuation agents, ultraviolet stabilizers, flame spread reducing agents, nucleation agents, thermal conductivity modifying agents, thermal stability agents and termite resistance agents. Functional shell additives can include both organic and inorganic materials such as iron oxide, manganese (IV) oxide and zinc borate ($Zn_3B_4O_9 \cdot 5H_2O$).

The primary shell material will typically include a major portion of one or more polymeric materials such as melamine formaldehyde (MF), polyurethane (PU), polymethyleneurea, polyester, polyethylene (PE), polypropylene (PP), polystyrene (PS), polyethylene terephthalate (PET), polycarbonate (PC), polyamide (PA), polyvinyl chloride (PVC) and polyvinyl alcohol (PVA). The particular shell material should be selected to be sufficiently thermally stable to avoid shell rupture under process conditions anticipated during compounding and formation processes of the polymeric products incorporating the microcapsules, typically up to at least about 250° C. Similarly, the shell materials should be selected and formed to provide sufficient mechanical strength to avoid rupture as a result of impacts and mechanical stress anticipated during the formation, storage and transportation of the microcapsules as well as the blending and forming processes of polymer products incorporating the microcapsules.

The shell material should also be chemically stable, i.e., generally non-reactive, within the expected operational temperature range during the formation and subsequent use of the polymeric product incorporating the microcapsules with respect to both the core material composition being encapsulated, such as HBCD, and with the polymer matrix of the intended polymeric product, such as an expanded polystyrene foam.

Conversely, the shell materials should also be selected and formed to decompose, melt or otherwise breakdown in order to release the microencapsulated core material composition including the functional additive under appropriate conditions. For example, when the functional additive is a flame retardant, the shell materials should be selected and formed to release the core material at elevated temperatures, such as about 400° C., to increase the flame resistance of the polymer product.

In making the microcapsules, core materials comprising generally insoluble hydrophobic powders or particles (e.g., HBCD, DCP, BE-51 and TPP) can be dispersed in an aqueous suspension. The shell material can then be applied to the dispersed particles through a process of coacervation to form a layer of the shell material around the dispersed core material particles. The coacervation (phase separation) may be induced by altering the pH or other properties to reduce the solubility of the shell material, such as a polyurethane or other thermoset polymer, thereby causing the shell material to precipitate and form a shell around the dispersed core material. Alternatively, interfacial or in situ polymerization processes may be used to form the shell layer.

In a typical polymerization between a diacylchloride and an amine or alcohol, may be used to produce a shell including polyurethane, polyester or polycarbonate. For example, an aqueous dispersion of HBCD particles and a diacylchloride may be formed and then an aqueous solution of an amine and a polyfunctional isocyanate may be added to the dispersion. A base may then be added to the aqueous dispersion to increase the pH, thereby causing a shell layer to form at the interface between the continuous aqueous phase and the dispersed core material to form microcapsules. The isocyanate acts as a crosslinking agent to increase the mechanical strength of the resulting shell layer and thereby increase the resistance of the microcapsules to impact damage.

Those skilled in the art will be familiar with various conventional reactors equipped with adjustable speed mixers which can be used to control microcapsule particle distribution. Such features of microcapsules as particle diameter and distribution, shell thickness, shell permeability, and shell strength can be adjusted by varying such reaction parameters as choice of solvent, concentration of aqueous suspension, stirring rate, temperature profile, and pH, all by conventional techniques that are well known to those skilled in the art.

In accordance with the present invention, the microcapsules are preferably spherical, with diameters less than about 20 microns, preferably less than about 6 microns. This sizing allows them to be compatible with the cell morphology (cell size, geometric layout, cell wall, and strut structure) of microcellular foamed polymer matrices. This sizing also allows the microcapsules to act as nucleating agents in the foaming process.

In preparing the polymer products incorporating the multifunctional microcapsules according to the present invention, conventional techniques such as foaming, extruding and molding may be utilized. For instance, extruded polystyrene polymer foams can be prepared in either twin screw extruders (low shear) or single screw extruders (high shear). Extruders typically include multi-feeders, extrusion screws with mixing capabilities, heating elements, gas injection ports, cooling zones, homogenizers, dynamic and/or static coolers, dies and/or shapers, vacuum chambers, pulling conveyers, cutting operations, and packaging facilities.

For polymeric compositions used to form foams incorporating the multifunctional microcapsules, a variety of blowing agents such as HCFC, HFC, $CO_2$, $H_2O$, inert gases and hydrocarbons may be used, either singly or in combination, and may include one or more nucleating agents such as talc. The blowing agents are typically used in relative amounts ranging from 3 to 15 weight percent based on the total weight of the polymer matrix and any additives. For example, HCFC-142b may be used at 8–14%, HFC-134a may be used at 4–10% along with 3% ethanol, and $CO_2$ may be used at 3–6% along with 1.8% ethanol. Foaming procedures typically involve melt mixing temperatures of 200–250° C., die melt temperatures of 100–130° C., and die pressures of 50–80 bar. The foaming expansion ratio—that is, the ratio of the expanded foam thickness to the width of the die gap through which the foam is extruded—is typically in the range 20–70.

EXAMPLES

Example 1

A polyurethane polymer was mixed with zinc borate ($Zn_3B_4O_9 \cdot 5H_2O$) and the mixture was crosslinked in aqueous solution. HBCD, water, and dispersing agent were separately mixed to form a suspension, which was then added to the aqueous solution. The resulting microencapsulated HBCD was filtered and washed to yield a product constituted of approximately 90 weight percent HBCD and 10 weight percent polyurethane. The mean diameter of the particles was 5.0 microns, and approximately 75 weight percent of the particles had diameters≦5 microns.

Figure 2:
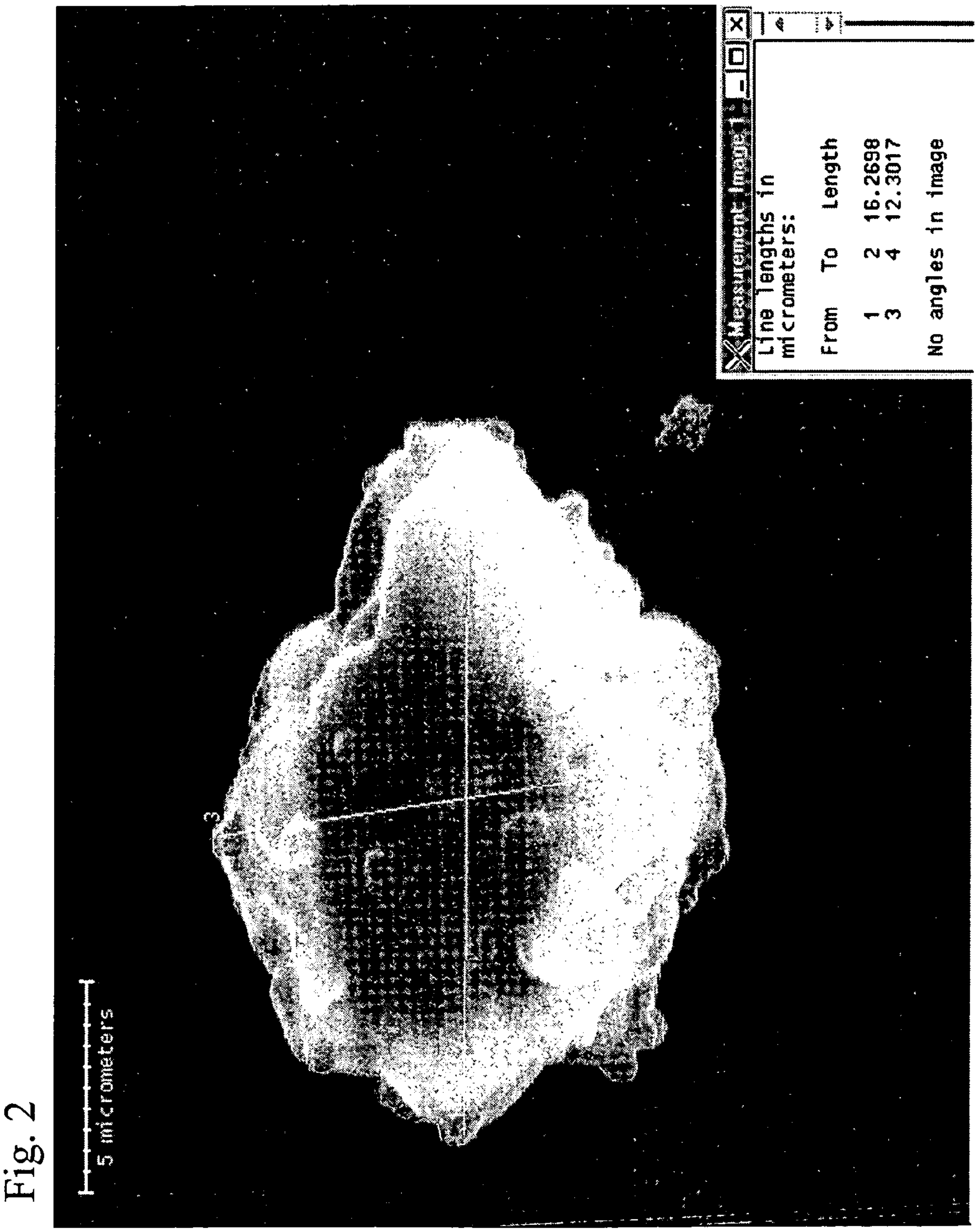
FIG. 2 shows the morphology of microencapsulated HBCD particles of this invention, at a scale of 20 $\mu$m.
Figure 3A:
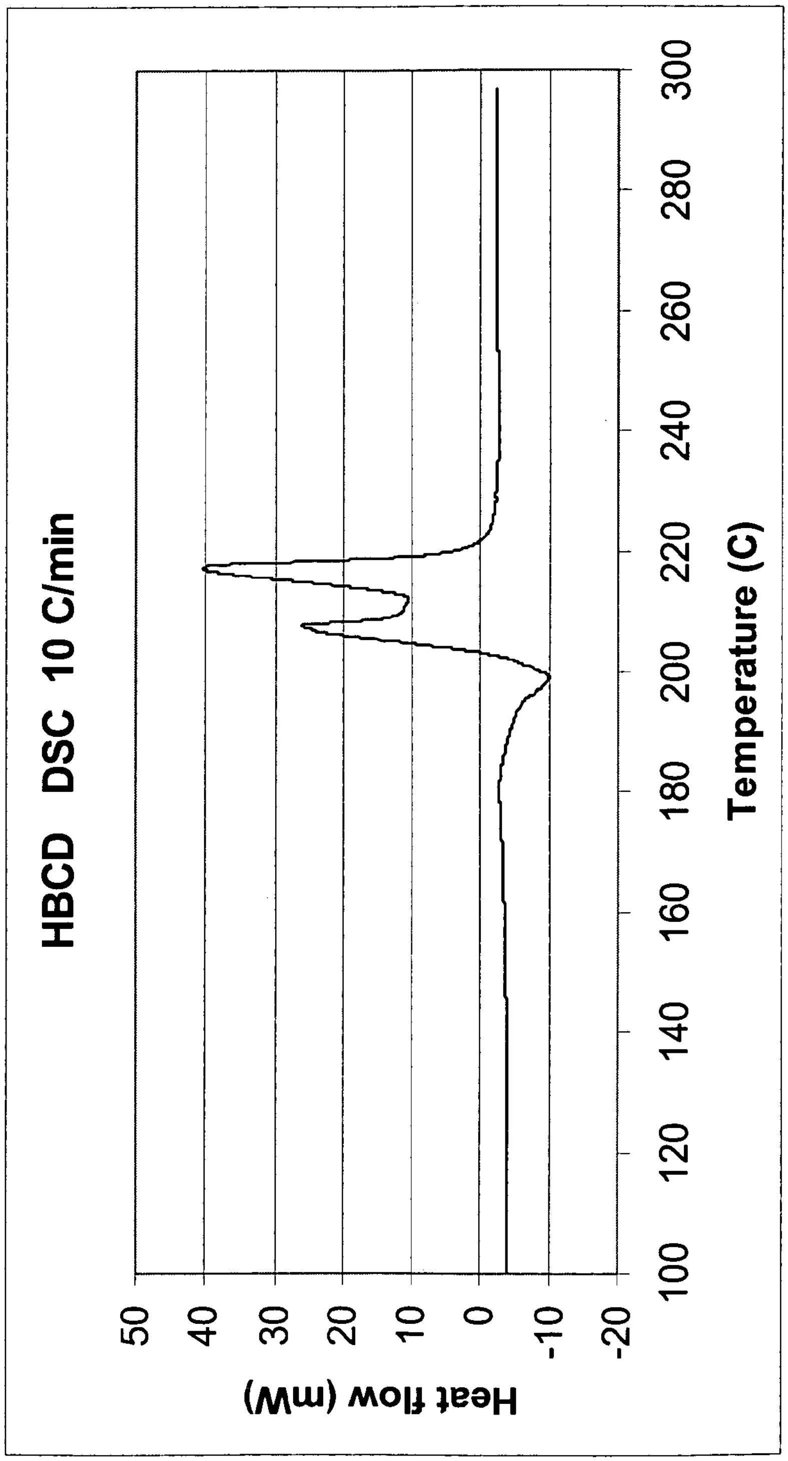
FIGS. 3A and 3B present differential scanning calorimetry (DSC) tests on conventional unencapsulated HBCD.
Figure 3B:
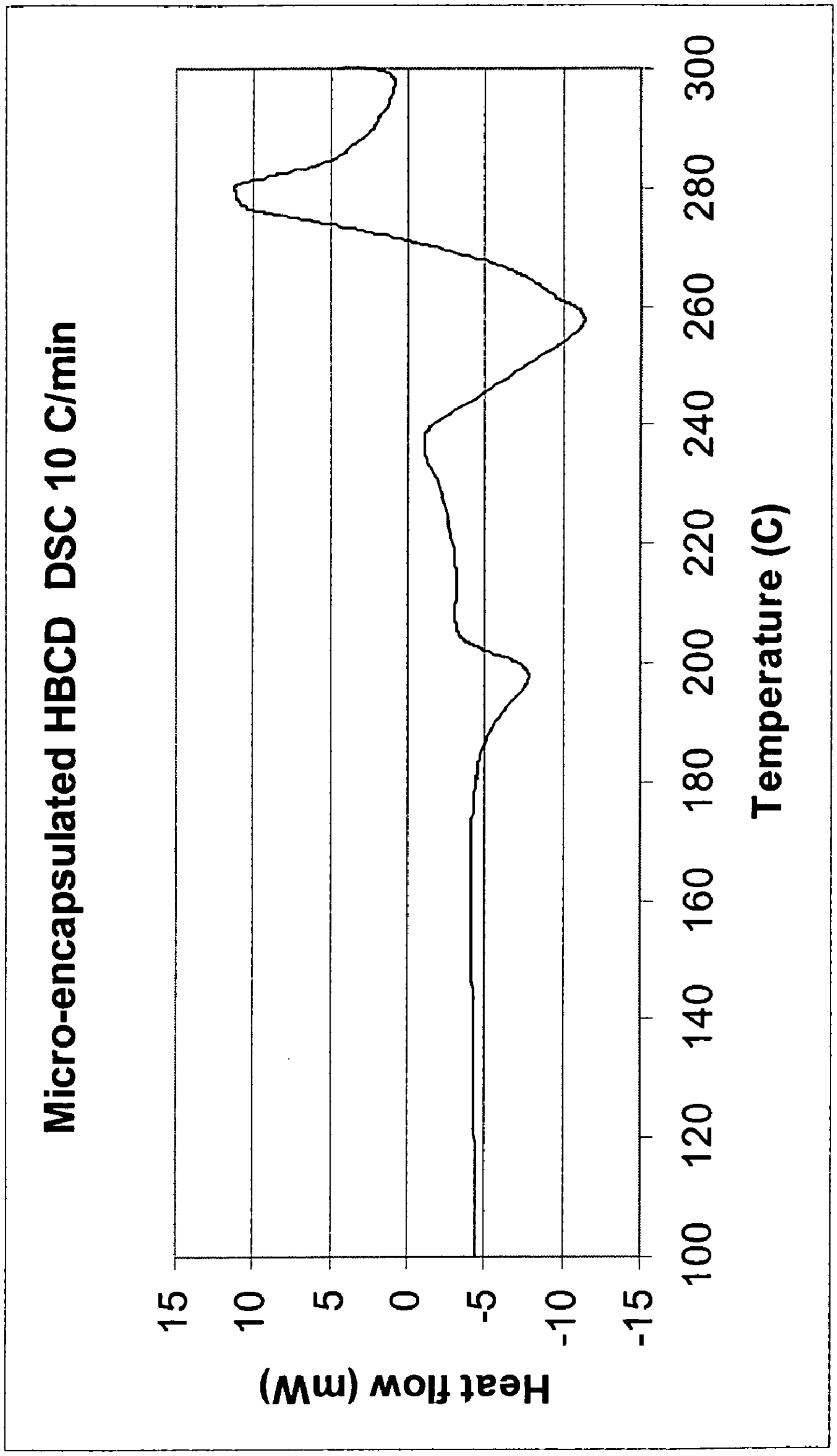

The morphology of the microencapsulated HBCD particles, at scales of 10 $\mu$m and 20 $\mu$m, respectively, are shown in FIGS. 1 and 2. The results of differential scanning calorimetry (DSC) tests, reported in FIG. 3, demonstrate that HBCD microencapsulated in accordance with the present invention (FIG. 3B) remains stable at temperatures approximately 60° C. higher than achieved with conventional unencapsulated HBCD (FIG. 3A).

Example 2

A polystyrene formulation was prepared by mixing 393 kg polystyrene, 2.4 kg talc, 1.8 kg pink colorant, and 3 kg of the microencapsulated HBCD product of Example 1. The formulation was mixed at 240° C. and 11 weight percent of a HCFC-142b blowing agent was added to the mixture under a pressure of 60 bar. The formulation was then extruded at 120° C. through a die, whereupon it expanded into a foam having an expansion ratio of approximately 60.

The resulting foam was 25 mm in thickness, with a cell size of approximately 0.31 mm×0.34 mm×0.30 mm. The foam had an oxygen index greater than 26% tested according to ASTM D2863, a fresh compressive strength of 180 kPa tested according to ASTM D1621, a fresh thermal conductivity at a 24° C. mean temperature of 0.0203 W/m·K tested according to ASTM C518, and a density of 35.1 kg/$m^3$ tested according to ASTM D1622.

Example 3

A polystyrene formulation was prepared by mixing 387 kg polystyrene, 2.4 kg talc, 0.4 kg pink colorant, and 10 kg of the microencapsulated HBCD product of Example 1. The formulation was mixed at 240° C. and 11 weight percent of a HCFC-142b blowing agent was added to the mixture under a pressure of 60 bar. The formulation was then extruded at 120° C. through a die, whereupon it expanded into a foam having and expansion ratio of approximately 60.

The resulting foam was 25 mm in thickness, with a cell size of approximately 0.29 mm×0.28 mm×0.27 mm. The foam had an oxygen index of 29% tested according to ASTM D2863, a fresh compressive strength of 184 kPa tested according to ASTM D1621, a fresh thermal conductivity at a 24° C. mean temperature of 0.0197 W/m·K tested according to ASTM C518, and a density of 35.3 kg/$m^3$ tested according to ASTM D1622.

Figure 4:
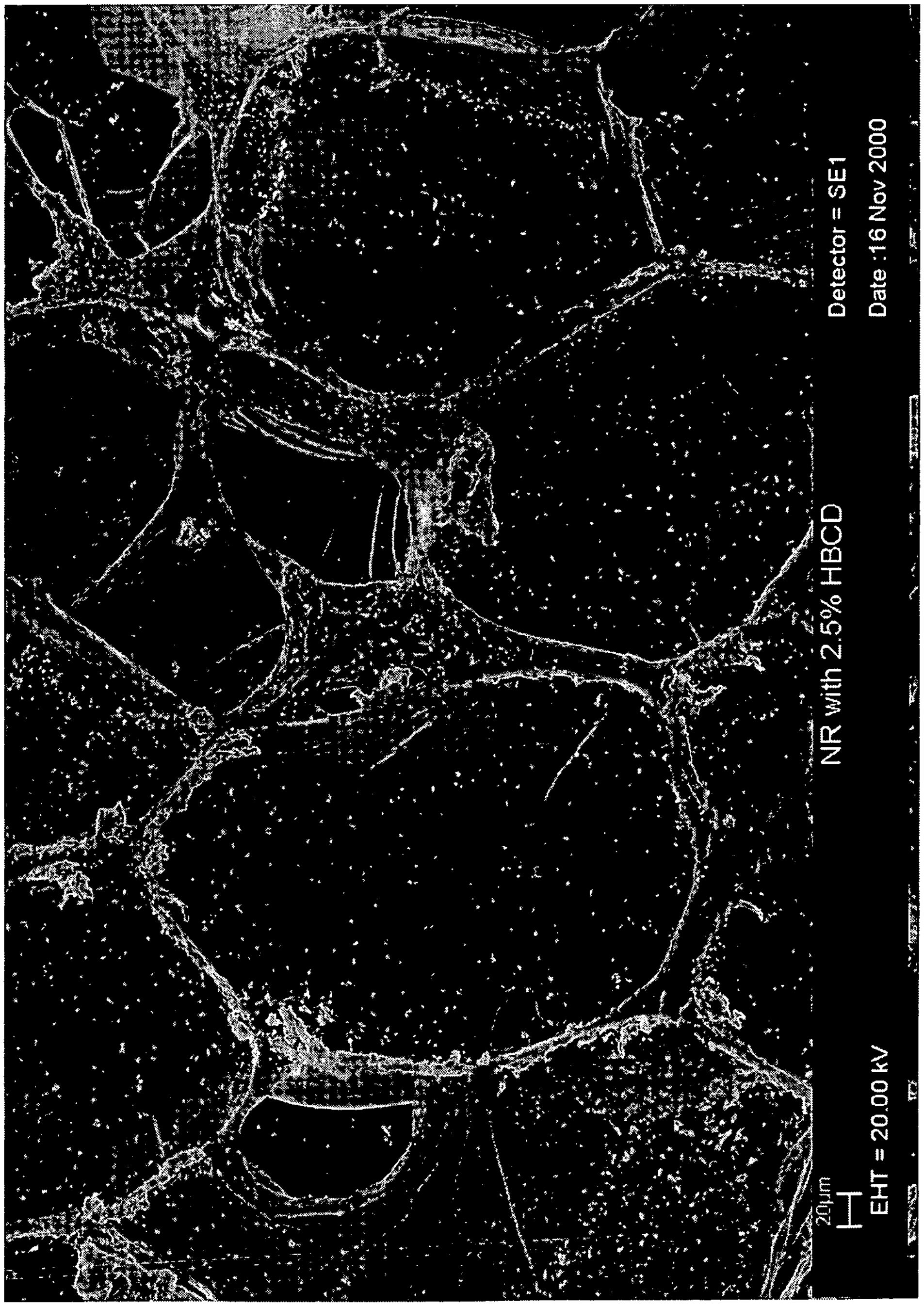
FIG. 4 shows the microstructure of a polystyrene foam of this invention.
Figure 5:
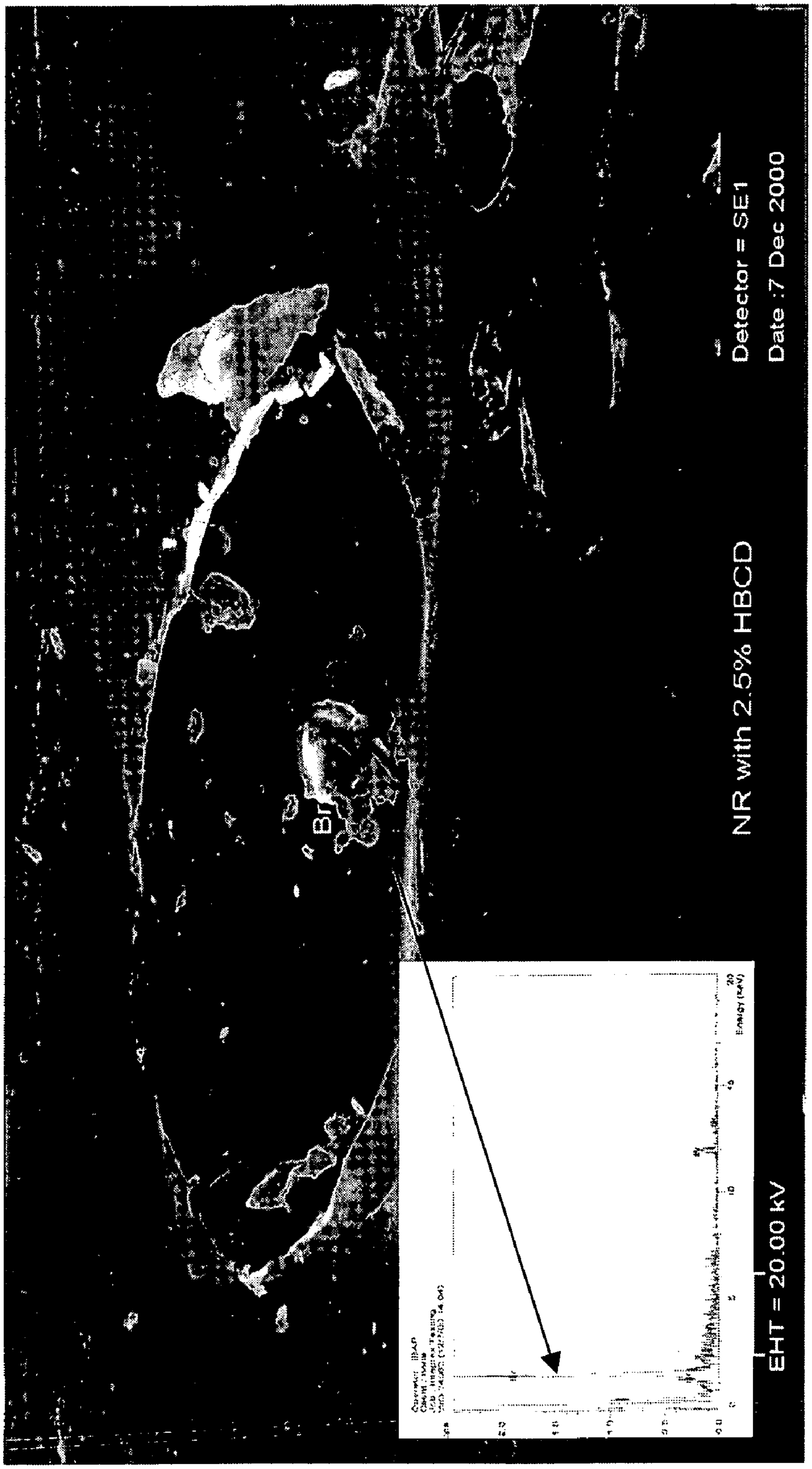
FIG. 5 shows the microstructure of a polystyrene foam of this invention and identifies a microencapsulated HBCD particle therein.

Two different views of the microstructure of this polystyrene foam are provided in FIGS. 4 and 5 illustrating the inclusion of the microcapsules within the polymer matrix of the polystyrene foam. In FIG. 5, a representative microencapsulated HBCD particle is identified by the symbol "Br."

Example 4

A polystyrene formulation was prepared by mixing 394 kg polystyrene, 2.4 kg talc, 0.4 kg pink colorant, and 3 kg of the microencapsulated HBCD product of Example 1. The formulation was mixed at 240° C. and 11 weight percent of a HCFC-142b blowing agent was added to the mixture under a pressure of 60 bar. The formulation was then extruded at 120° C. through a die, whereupon it expanded into a foam. The expansion ratio—that is, foam thickness to die gap—was approximately 60.

The resulting foam was 25 mm in thickness, with a cell size of approximately 0.28 mm×0.29 mm×0.29 mm. The foam had an oxygen index of 27.2% tested according to ASTM D2863, a fresh compressive strength of 176 kPa tested according to ASTM D1621, a fresh thermal conductivity at a 24° C. mean temperature of 0.0260 W/m·K tested according to ASTM C518, and a density of 35.9 kg/$m^3$, tested according to ASTM D1622.

Example 5

Samples of microencapsulated HBCD and current flame retardant were evaluated in the presence of a polystyrene resin containing substantially no zinc and a polystyrene resin containing approximately 1500 ppm zinc. A melamine formaldehyde resin was used for form the shell layer of the microcapsules in Sample A and a polyvinyl chloride resin was used to form the shell layer of the microcapsules in Sample B. A control sample used conventional unencapsulated HBCD.

The samples were then tested for chemical stability using a modified method based on GB 1680; UDC 665.41:678.016 "Standard Test Method of Chlorinated Parafins-Determination of Thermal Stability Index." The samples were placed in test tubes and submersed in an oil bath with a pH sensitive litmus paper placed at the top of each tube. A magnetic stirring device was used to help ensure that the oil bath and test tubes were uniformly heated. The temperature of the oil bath was increased at a rate of approximately 10° C. per minute. The samples were visually evaluated for melting temperature and color changes in the pH sensitive litmus paper that would indicate the release of acid from the flame retardant (designated the decomposition temperature). The table below shows the temperature at which the release of acid occurred from the flame retardant as indicated by a color change in the litmus paper.

| Material | PS Resin 0 ppm Zn Decomposition Temp. ° C. | PS Resin 1500 ppm Zn Decomposition Temp. ° C. |
| --- | --- | --- |
| Sample A ME-HBCD | 237 | 225 |
| Sample C Control* | 256 | 234 |
| Sample B ME-HBCD | 255 | 252 |

*Stabilized HBCD SP 75 from Great Lakes Chemical Company

As reflected in the decomposition temperature data, encapsulating the functional core material in a polymeric shell decreased the difference between decomposition temperatures for the substantially zinc-free and zinc-containing compositions relative to the unencapsulated sample. Indeed, utilizing a polyvinyl chloride shell material reduced the difference in decomposition temperature to approximately 3° C. compared with approximately 22° C. for the unencapsulated HBCD.

It will be apparent to those skilled in the art that certain modifications and variations can be made in the core materials, the shell materials and the resulting polymer products without departing from the scope of the invention defined by the appended claims.

What is claimed is:

1. A polymeric foam comprising:

a polymeric matrix; and a plurality of multifunctional microcapsules distributed in the polymeric matrix, the microcapsules including a core material that provides a flame retarding function surrounded by a layer of a shell composition that provides at least one of fire retarding, flame suppressing, conductivity modifying, thermal stabilizing or insecticidal functions.

2. The polymeric foam according to claim 1, wherein:

the core material includes a major portion of flame retardant; and the shell material includes a major polymeric component and a minor functional additive component.

3. The polymeric foam according to claim 2, wherein:

the polymeric matrix includes polystyrene; and the microcapsules have a median diameter of less than 5 μm.

4. A polymeric foam according to claim 2, wherein:

the major polymeric component includes at least one material selected from a group consisting of melamine formaldehyde, polyvinyl alcohol, polyester and polycarbonate; and the minor functional additive component includes at least one material selected from a group consisting of fire retardants, flame suppressors, conductivity modifiers, thermal stabilizers and insecticides.

5. The polymeric foam according to claim 2, wherein:

the flame retardant is selected from a group consisting of HBCD, DCP, BE-51, TPP and mixtures thereof; and the major polymeric component is melamine formaldehyde and the minor functional additive component includes zinc borate.

6. The polymeric foam according to claim 2, wherein:

the microcapsules account for between about 0.25 and about 10 weight percent of the polymeric foam; and the microcapsules have a median diameter no larger than about 5 microns.

7. The polymeric foam according to claim 2, wherein:

the flame retardant is selected from a group consisting of HBCD, DCP, BE-51, TPP and mixtures thereof; and the major polymeric component is a polyurethane and the minor functional additive component includes zinc borate.

* * * * *

UNITED STATES PATENT AND TRADEMARK OFFICE

CERTIFICATE OF CORRECTION

PATENT NO. : 7,005,457 B2
APPLICATION NO. : 10/600942
DATED : February 28, 2006
INVENTOR(S) : Loh It is certified that error appears in the above-identified patent and that said Letters Patent is hereby corrected as shown below:

Title page, (73), Should read --Owens Corning Fiberglas Technology, Inc., Summit, IL (US); OC (Nanjing) Foamular Board Company, Limited, Nanjing, Jiangau (CN)--

Signed and Sealed this

Thirteenth Day of February, 2007

JON W. DUDAS
*Director of the United States Patent and Trademark Office*